(12) United States Patent
Fitch, Jr. et al.

(10) Patent No.: US 6,325,016 B1
(45) Date of Patent: Dec. 4, 2001

(54) PIZZA SAUCE FLOW DIVERTER

(75) Inventors: Clifford E. Fitch, Jr., Beecher, IL (US); Clifford E. Fitch, III, Dyer, IN (US); James N. Egan, Mt. Prospect, IL (US); Michael Anderson, Lowell, IN (US)

(73) Assignee: Rota Skipper Corp., South Holland, IL (US)

( * ) Notice: Subject to any disclaimer, the term of this patent is extended or adjusted under 35 U.S.C. 154(b) by 0 days.

(21) Appl. No.: 09/490,381

(22) Filed: Jan. 24, 2000

(51) Int. Cl.$^7$ ................ A23L 1/00; A21C 9/04; B05C 5/00; B65D 88/54

(52) U.S. Cl. ................ 118/25; 118/13; 118/24; 118/411; 99/450.1; 99/450.7; 99/516; 222/309; 222/330; 222/564; 222/380

(58) Field of Search .............. 99/494, 516, 450.1, 99/450.2, 450.6, 450.7; 118/13, 24, 25, 411; 222/309, 330, 334, 382, 380, 564; 239/504, 553.3, 555.5

(56) References Cited

U.S. PATENT DOCUMENTS

| | | |
|---|---|---|
| Re. 36,178 | 4/1999 | Freudinger et al. . |
| 1,994,797 | 3/1935 | Thomas . |
| 2,715,878 | 8/1955 | Egerton . |
| 3,193,029 | 7/1965 | Harvison et al. . |
| 3,241,625 | 3/1966 | Soojian . |
| 3,283,955 | * 11/1966 | Crabtree ............ 222/309 X |
| 3,358,618 | * 12/1967 | Vetta ................. 99/450.1 |
| 3,368,501 | 2/1968 | Kuhlman . |
| 3,522,854 | 8/1970 | Liedtke . |
| 3,525,374 | 8/1970 | Fitch . |
| 3,631,818 | * 1/1972 | Zito .................. 99/450.1 |
| 3,633,450 | 1/1972 | Grote . |
| 3,633,489 | 1/1972 | Spoelhof et al. . |
| 3,662,677 | * 5/1972 | Westling .............. 99/450.1 |
| 3,682,106 | 8/1972 | Kuhlman . |
| 3,725,974 | 4/1973 | Kuhlman . |
| 3,735,692 | * 5/1973 | Marchignoni ......... 99/516 X |

(List continued on next page.)

OTHER PUBLICATIONS

"Computerized QC System Streamlines Weight Checking," by Jay Hargrove, Syscon Corporation, Washington, D.C, undated.

"On–Line Weighing System Slashes Inventories, Speeds Processing," Modern Materials Handling, Oct. 1988.

"Electronic Scales Measure Up On Filling, Assembly Lines," UNILUX Hackensack, N.J, undated.

"Computer Feedback On Line," Package Engineering., undated.

"Computerized Scale System Cuts Give–Away, Waste," by Kate Bertrand, Associate Editor, undated.

*Primary Examiner*—Timothy F. Simone
(74) *Attorney, Agent, or Firm*—Wallenstein & Wagner

(57) ABSTRACT

A food material dispensing apparatus for adding a sauce to a target food is claimed. The dispensing comprises a pump, a supply manifold, and a dispensing manifold. The pump draws a quantity of sauce from a source into the supply manifold and forces the sauce through the dispensing manifold to the target food. The supply manifold receives the sauce from the source. The sauce is transferred to the dispensing manifold through which the sauce material is transferred to the target food. A baffle suspended in the dispensing manifold. The baffle has a peripheral edge and a central portion displaced a distance from a substantially horizontal plane defined by the peripheral edge by a positioning portion which connects the central portion to the peripheral edge. A pattern plate is positioned downstream from the baffle and has a plurality of apertures for delivering the predetermined quantity of sauce in a predetermined pattern to the target food.

11 Claims, 3 Drawing Sheets

U.S. PATENT DOCUMENTS

| | | |
|---|---|---|
| 3,760,715 | 9/1973 | Grote et al. . |
| 3,779,205 | 12/1973 | Kuhlman . |
| 3,780,643 | 12/1973 | Papai . |
| 3,858,545 | 1/1975 | Fischer et al. . |
| 3,908,584 | 9/1975 | Raque . |
| 3,943,601 | 3/1976 | Kuhlman . |
| 3,945,448 | 3/1976 | Sellers . |
| 3,980,235 | 9/1976 | Kuhlman . |
| 4,060,027 | 11/1977 | Jenny . |
| 4,068,570 | 1/1978 | Lanoie . |
| 4,112,834 | 9/1978 | Thiry . |
| 4,128,074 | 12/1978 | Rejsa . |
| 4,145,990 * | 3/1979 | Hochandel et al. .............. 118/25 |
| 4,152,976 | 5/1979 | Kawasaki et al. . |
| 4,197,794 | 4/1980 | Raque et al. . |
| 4,202,260 | 5/1980 | Weger . |
| 4,225,001 | 9/1980 | Gillenkirch . |
| 4,230,007 | 10/1980 | Grote et al. . |
| 4,248,173 | 2/1981 | Kuhlman . |
| 4,264,634 | 4/1981 | Hochandel et al. . |
| 4,389,562 * | 6/1983 | Chaudoir .................. 99/450.7 X |
| 4,395,427 | 7/1983 | Fischer et al. . |
| 4,438,686 | 3/1984 | Perez . |
| 4,771,726 | 9/1988 | Fitch, Jr. . |
| 4,778,365 | 10/1988 | Archer . |
| 4,801,097 | 1/1989 | Fitch, Jr. . |
| 4,832,961 | 5/1989 | Aoki . |
| 4,839,185 | 6/1989 | Gram . |
| 4,850,845 | 7/1989 | Hicks . |
| 4,907,720 | 3/1990 | Henson et al. . |
| 4,909,412 * | 3/1990 | Cerf .............................. 118/25 X |
| 4,960,025 | 10/1990 | Fitch . |
| 5,012,726 | 5/1991 | Fehr et al. . |
| 5,073,391 | 12/1991 | DeMars et al. . |
| 5,121,677 | 6/1992 | Le Claire et al. . |
| 5,171,367 | 12/1992 | Fitch, Jr. . |
| 5,458,055 | 10/1995 | Fitch, Jr. . |
| 5,523,101 | 6/1996 | Fitch, Jr. . |
| 5,678,476 | 10/1997 | Sanders . |

* cited by examiner

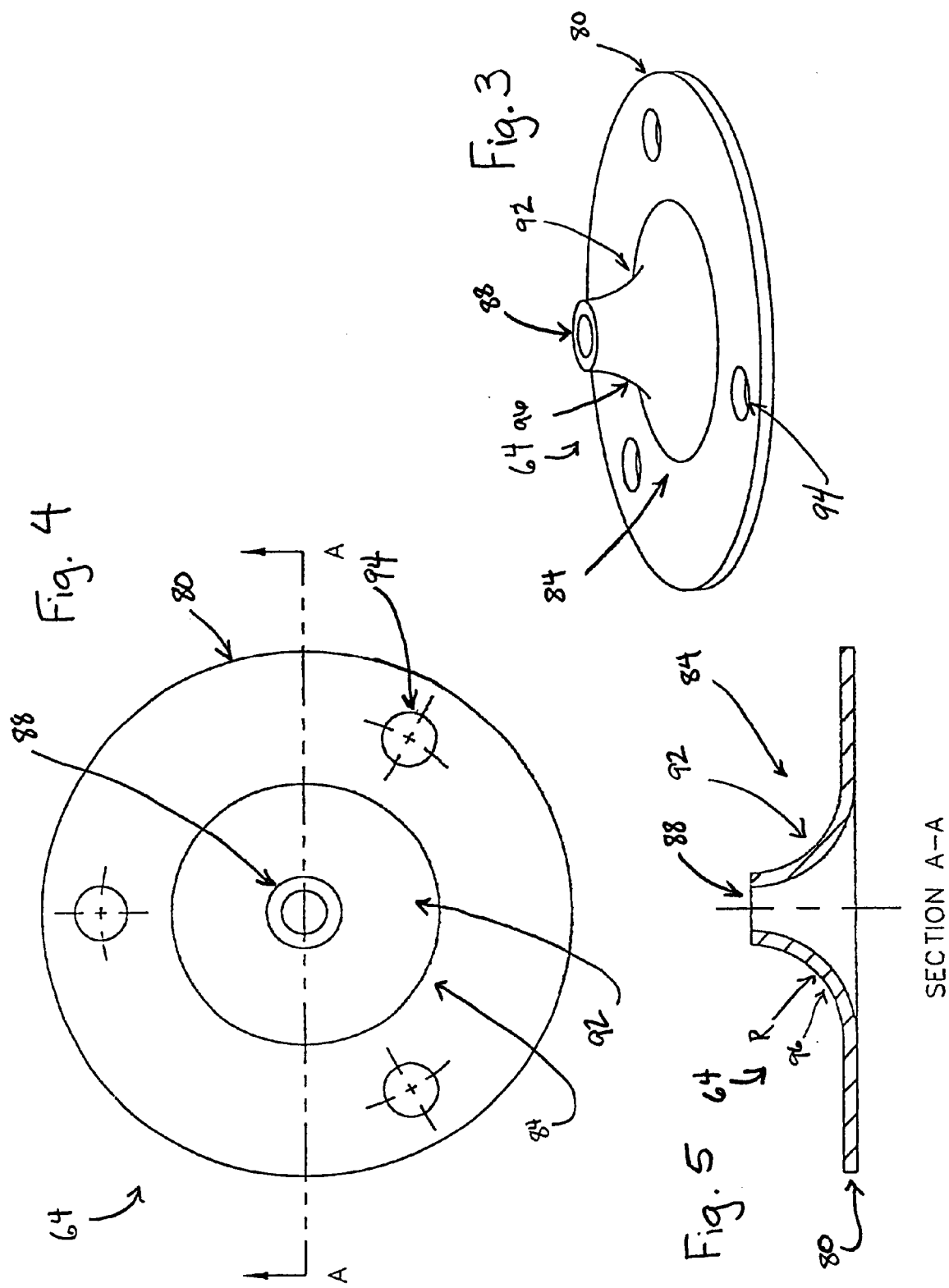

PIZZA SAUCE FLOW DIVERTER

TECHNICAL FIELD

The present invention relates generally to automated dispensing devices, and, more particularly to an apparatus for applying pizza sauce to individual pizza shells, such as at a high volume producer of frozen pizzas.

BACKGROUND

Pizza making is generally a labor intensive undertaking. Pizza crusts or shells are produced from a dough substance, and seasoned tomato sauce is spread evenly over the shell. Finally, other toppings such as cheese, meats, and vegetables are added according to personal taste. In many situations, it is advantageous to produce pizzas as fast as possible. This is the case in the manufacture of frozen pizzas.

It is simply not cost effective to manually produce individual frozen pizzas. In order for the manufacturer to achieve a suitable profit margin, frozen pizzas must be produced rapidly with as little human intervention as possible. Manufacturers have incorporated many different devices in the pizza making operation to automate certain tasks. Chief among these tasks is the addition of toppings. For instance, U.S. Pat. No. 3,525,374 describes an automated pizza meat dispenser; U.S. Pat. No. 4,771,726 describes an automated device for adding a flowable material, such as pizza sauce, to a food target, U.S. Pat. No. 4,801,097 describes a food ingredient dispensing device; U.S. Pat. No. 5,171,367 and U.S. Pat. No. Re. 36,178 describe apparatuses for applying pizza sauce to a pizza; and U.S. Pat. No. 5,523,101 describes a multi-purpose applicator.

Generally, automated pizza sauce dispensing devices include dispensing manifolds having baffles or diffuser plates for uniformly distributing a flowable pizza sauce about a pattern plate which ultimately delivers the flowable food material to a pizza shell, U.S. Pat. No. 5,407,102 and U.S. Pat. No. Re. 36,178 include such baffles, as do Pizzamatic Sauce Dispenser Models 2100 and 2400.

The baffles of the prior art are often uniquely manufactured for the sauce dispenser application depending on the consistency, viscosity, and volume of the sauce applied to the shell. However, frozen pizza makers frequently change the style of sauce applied to their pizza shells. Since pizza sauces vary in consistency and viscosity it would be advantageous to design a single baffle which will uniformly distribute many different types of pizza sauce about a pattern plate.

Therefore, there is a need for an apparatus for adding a flowable material to a shell for use in the pizza making industry as described herein.

SUMMARY OF THE INVENTION

The present invention comprises an apparatus for dispensing a quantity of a flowable material to a target object. The dispensing apparatus comprises a supply manifold assembly, a portion control pump assembly, and a dispensing manifold assembly.

The supply manifold includes an passageway having a ferrule inlet, an upper valve adaptor, and an outlet passage portion. The ferrule inlet is in alignment with and joined to a material supply conduit which is in communication with a source of flowable material. The conduit transports the flowable material from the source to the supply manifold.

The upper valve adaptor includes an upper valve which allows the flowable material to be withdrawn from the source of material upon the up-stroke of the portion control pump and prevents the flowable material from being forced back into the source on the down-stroke of the portion control pump.

The dispensing manifold includes a dispensing chamber, a manifold plate, a baffle, and a pattern plate. An outlet valve is positioned within supply manifold adjacent an aperture in the manifold plate. The outlet valve prevents the flowable material from being drawn from the dispensing manifold upon the up-stroke of the piston pump and allows the flowable material to enter the dispensing chamber upon the down-stroke of the piston pump.

The dispensing chamber is formed between the manifold plate and the pattern plate. The baffle is suspended within the dispensing manifold in the dispensing chamber between the manifold plate and the pattern plate. The baffle is approximately, centrally aligned with the aperture in the manifold plate.

The baffle includes a peripheral edge and a central portion. A delivery orifice is positioned within the central portion. The delivery orifice is displaced from a substantially horizontal plane defined by the peripheral edge of the baffle. The delivery orifice is generally displaced in a direction which is towards the aperture in the manifold plate. A delivery orifice positioning portion of the baffle plate slopes upwardly from the delivery orifice towards the peripheral edge to displace the delivery orifice from the peripheral edge of the baffle.

The pattern plate is positioned downstream of the manifold plate and the baffle. The pattern plate receives sauce material diffused by the baffle and delivers it in a predetermined pattern to a pizza shell The pattern plate is provided at a given thickness to provide a plurality of apertures with sufficient length to provide friction between the sauce material to be passed therethrough. Depending upon the consistency, viscosity, and volume of the sauce material applied, any residual sauce material is retained within the plurality of apertures during the up-stroke of the piston pump. The plurality of apertures are arranged in a desired pattern to insure proper coverage of sauce on the pizza shell.

Other features and advantages of the invention will be apparent from the following specification taken in conjunction with the following drawing.

BRIEF DESCRIPTION OF THE DRAWINGS

FIG. 3 is a perspective view of a flow diverter of the present invention;

FIG. 4 is a top view of a flow diverter of the present invention; and

FIG. 5 is a cross-sectional view along A—A of FIG. 4.

DETAILED DESCRIPTION

Figure 1:
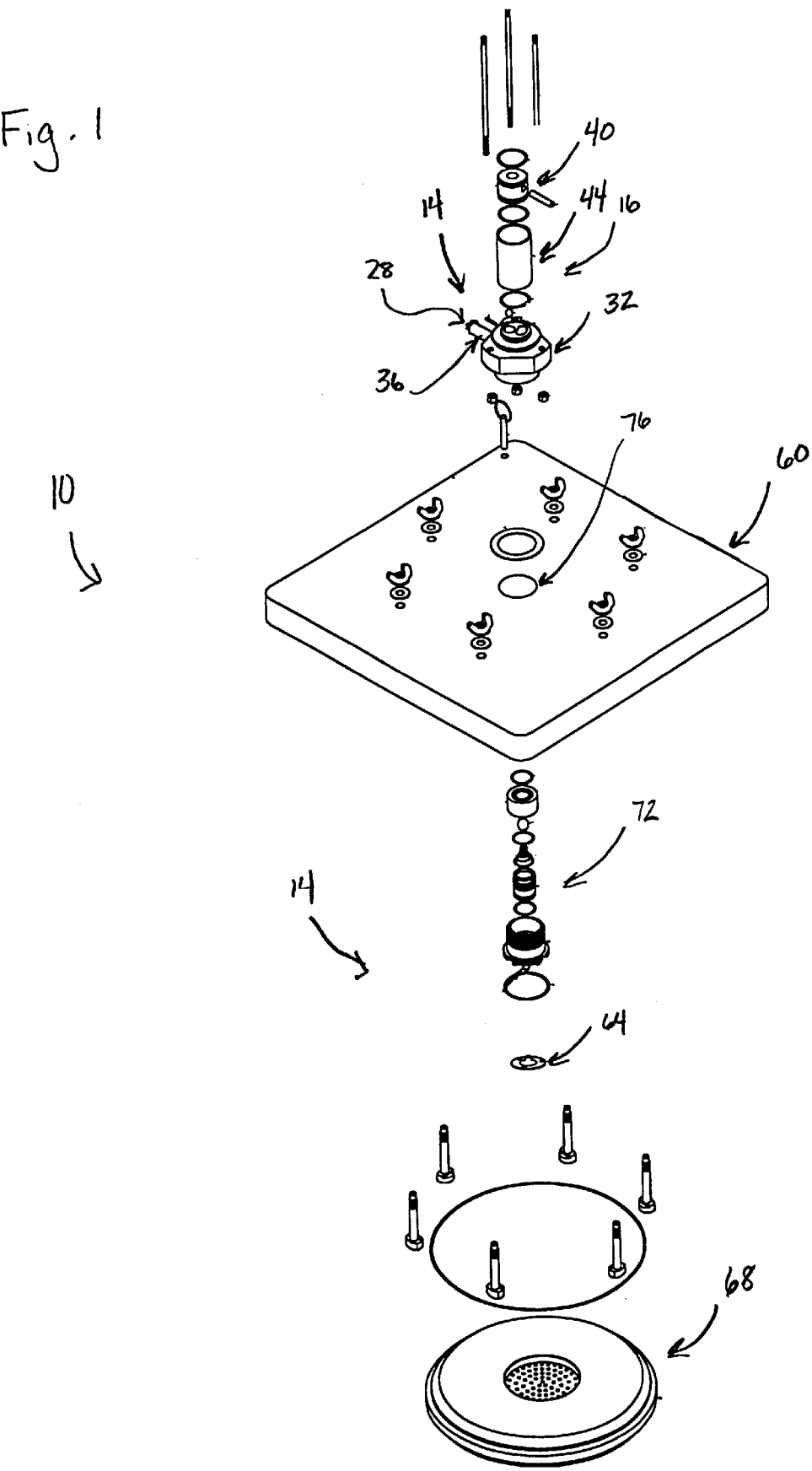
FIG. 1 is an exploded view of an apparatus for dispensing a quantity of material on a shell.

While this invention is susceptible of embodiments in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated.

An apparatus for dispensing a quantity of a flowable material 10 is illustrated in FIG. 1. The dispensing apparatus 10 is particularly useful in delivering pizza sauce to a pizza shell. The dispensing apparatus 10 comprises a supply manifold assembly 14, a portion control piston pump assembly 16, and a dispensing manifold assembly 20.

Figure 2:
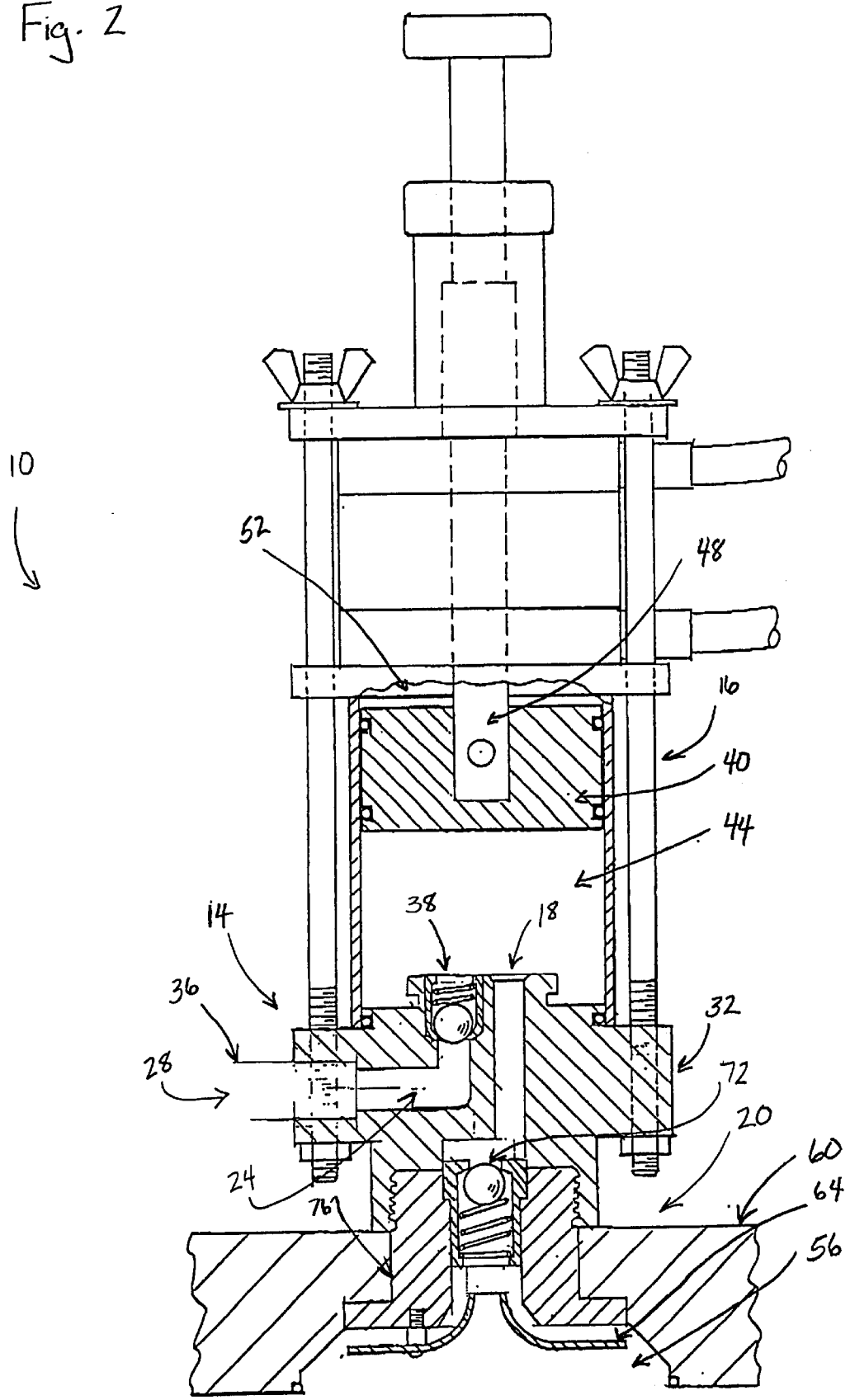
FIG. 2 is a partial cross-sectional view of an apparatus for dispensing a quantity of material on a shell including a flow diverter of the present invention.

Now referring to FIG. 2, the supply manifold 14 includes an inverted L-shaped passageway 24 having a ferrule inlet 28, an upper valve adaptor 32, and an outlet passage portion 18 The ferrule inlet 28 is in alignment with and joined to a material supply conduit 36 which is in communication with a source of flowable material. The conduit 36 transports the flowable material from the source to the supply manifold 14.

The upper valve adaptor 32 includes an upper valve 38 which allows the flowable material to be withdrawn from the source of material upon the up-stroke of the portion control piston pump 16 and prevents the flowable material from being forced back into the source on the down-stroke of the portion control piston pump 16.

The portion control piston pump 16 is provided for drawing the flowable material from the source into the supply manifold 14 and forcing the flowable material from the supply manifold to the dispensing manifold 20. The portion control piston pump 16 is generally a piston 40 having cylindrical chamber 44, and a pump actuating cylinder body 48 having a cylindrical air chamber 52. The cylindrical chamber 44 is axially connected to, and in material passing communication with, the supply manifold 14 via the inverted L-shaped passageway 24.

The dispensing manifold 20 generally includes a dispensing chamber 56, a manifold plate 60, a baffle 64, and a pattern plate 68 An outlet valve 72 is positioned within supply manifold 14 adjacent an aperture 76 in the manifold plate 60. The outlet valve 72 prevents the flowable material from being drawn from the dispensing manifold 20 upon the up-stroke of the piston pump 16 and allows the flowable material to enter the dispensing chamber 56 upon the down-stroke of the piston pump 16,.

The dispensing chamber 56 is formed between the manifold plate 60 and the pattern plate 68. The baffle 64 is suspended within the dispensing manifold in the dispensing chamber 56 between the manifold plate 60 and the pattern plate 68. The baffle 64 is approximately, centrally aligned with the aperture 76 in the manifold plate 60.

Baffles 64 are well-known in the art and commonly used to disperse flowable and particulate material about a target location such as the pattern plate 68. Baffles 64 provide a spreading and diffusing distributing action of flowable or particulate material by providing a spaced obstacle which the material encounters prior to contact with the pattern plate 68. In this malier, the baffle 64 evenly distributes the material to the pattern plate 68.

In sauce dispensers, baffles 64 are primarily solid plate members. Some baffles 64 have passages bored through them to allow some volume of the material to be dispersed through the passages to the pattern plate 68. In the pizza sauce dispensing field, these types of baffles 64 are often designed through experimentation or trial and error for the particular consistency, viscosity, or volume of sauce added to the pizza shell by the pizza maker. In other words, the passages are provided in the baffle 64 as needed and are often unique to a given application.

The baffle 64 described herein is useful with many different pizza sauces. Thus, rather than experimenting through trial and error to provide a suitable baffle 64, the baffle 64 of the present invention may simply be mounted within the dispensing chamber 56 without regard to the consistency viscosity, or volume of pizza sauce added to the pizza.

Referring to FIGS. 3–5, the baffle 64 includes a peripheral edge 80 and a central portion 84. A delivery orifice 88 is positioned within the central portion 84. The delivery orifice 88 is displaced from a substantially horizontal plane defined by the peripheral edge 80 of the baffle 64. The delivery orifice 88 is generally displaced in an upward direction towards the aperture 76 in the manifold plate 60. A delivery orifice 88 positioning portion 92 of the baffle plate 64 slopes from the central portion 84 and the delivery orifice 88 towards the peripheral edge 80 to displace the central portion 84 and the delivery orifice 88 from the peripheral edge 80 of the baffle 64. Accordingly, the baffle 64 of the present invention can take various shapes, including conical, horned, or funneled.

As shown in FIGS. 3 and 5, the baffle 64 is horn-shaped. The positioning portion 92 has an arcuate portion 96 having a radius of curvature R. It should be understood that the positioning portion 92 can take variety of shapes and/or slopes without departing from the spirit of the invention. The positioning portion also includes a plurality of mounting holes 94. The mounting holes 94 in combination with a corresponding plurality of hangars cooperate to suspend the baffle within the dispensing manifold 20. (See FIG. 2).

The positioning portion 92 may also include passages therethrough to allow additional flowable material to pass through the central portion 84 of the baffle 64. Furthermore, the peripheral edge 80 can take a variety shapes, including, but not limited to, round, rectangular, scalloped, and star-shaped without departing from the spirit of the invention.

Referring to FIG. 1, the pattern plate 68 is positioned downstream of the manifold plate 60 and the baffle 64. The pattern plate 68 receives sauce material diffused by the baffle 64 and delivers it in a predetermined pattern to a pizza shell. The pattern plate 68 is provided at a given thickness to provide a plurality of apertures 96 with sufficient length to provide friction between the sauce material to be passed therethrough. Depending upon the consistency, viscosity, and volume of the sauce material applied, any residual sauce material is retained within the plurality of apertures 96 during the up-stroke of the piston pump 16. The plurality of apertures 96 are arranged in a desired pattern to insure proper coverage of sauce on the pizza shell.

In operation, upon an up-stroke of the piston pump 16, pizza sauce is drawn from an external source through the inlet 28 and into the supply manifold 14 from an external source. Upon the down-stroke of the piston pump 16, the pizza sauce is discharged from the supply manifold 14 through the aperture 76 in the dispensing manifold plate 60 to the dispensing manifold 20. Once within the dispensing manifold 20, the pizza sauce is diffused about the pattern plate 68 by the baffle 64. The pizza sauce is then discharged through the plurality of apertures 96 in the pattern plate 68 to the pizza shell.

When the above cycle is completed, a precise amount of pizza sauce will flow from supply manifold 14 into the dispensing manifold 20 around and through suspended baffle 64 and out through plurality of apertures 96 of pattern plate 68 in a predetermined pattern and volume.

While specific embodiments have been illustrated and described, numerous modifications are possible without departing from the spirit of the invention, and the scope of protection is only limited by the scope of the accompanying claims.

What is claimed is:

1. A food material dispensing apparatus for adding a sauce to a target food, comprising:

a supply manifold for receiving a predetermined quantity of sauce from a source;

a dispensing manifold through which the sauce material is transferred to the target food;

a baffle disposed in the dispensing manifold, the baffle having a peripheral edge and a central portion vertically displaced a distance from a substantially horizontal plane defined by the peripheral edge by a positioning portion which connects the central portion to the peripheral edge; and a pump for drawing the quantity of sauce from the source into the supply manifold and forcing the sauce through the dispensing manifold to the target food.

2. The food material dispensing apparatus of claim 1 wherein the positioning portion has an upwardly sloping wall.

3. The food material dispensing apparatus of claim 2 wherein the upwardly sloping wall of the positioning portion includes an arcuate portion.

4. The food material dispensing apparatus of claim 1 wherein the baffle is horn-shaped.

5. The food material dispensing apparatus of claim 1 wherein the central portion of the baffle includes a delivery orifice through which the sauce passes.

6. The food material dispensing apparatus of claim 5 wherein the delivery orifice is displaced from the peripheral edge by the positioning portion.

7. The food material dispensing apparatus of claim 6 wherein the positioning portion includes an upwardly sloping wall.

8. The food material dispensing apparatus of claim 7 wherein the upwardly sloping wall has an arcuate shape.

9. The food material dispensing apparatus of claim 8 wherein the baffle is horn-shaped.

10. The food material dispensing apparatus of claim 5 wherein the delivery orifice is round.

11. The food material dispensing apparatus of claim 1 further comprising a pattern plate downstream from the baffle and having a plurality of apertures for delivering the predetermined quantity of sauce in a predetermined pattern to the target food.

* * * * *